June 28, 1966     H. J. GEVELHOFF     3,257,805

RAPID IGNITION SOLID PROPELLANT ROCKET MOTOR

Filed April 13, 1964

Hans J. Gevelhoff,
*INVENTOR.*

United States Patent Office 3,257,805
Patented June 28, 1966

3,257,805
RAPID IGNITION SOLID PROPELLANT
ROCKET MOTOR
Hans Joachim Gevelhoff, 9334 Salisbury,
El Paso 24, Tex.
Filed Apr. 13, 1964, Ser. No. 359,528
8 Claims. (Cl. 60—35.6)

The invention described herein may be manufactured and used by or for the Government for governmental purposes without the payment of any royalty thereon.

The invention relates to the rapid ignition of solid propellant rocket motors, and more particularly, to the rapid ignition of relatively large rocket motors.

Exhaust nozzles operate efficiently at maximum thrust. The accurate determination of the trajectory of a ballistic missile requires efficient nozzle operation during substantially the entire firing period of the missile. Rapid thrust build-up and decay allow the missile nozzle to operate at greatest efficiency for the longest time period. A nozzle operating at greatest efficiency in turn results in the greatest accuracy and most reliable determination trajectory of the ballistic missile.

The problem of rapid thrust build-up is less serious in small solid propellant motors. In such motors only a small propellant surface is exposed and burned at any given instant. Therefore, substantially complete ignition of the entire propellant burning surface of small solid propellant motors occurs nearly instantaneously resulting in a rapid thrust build-up.

Relatively large motors present correspondingly large propellant surfaces for ignition. Thus, the time required to accomplish ignition of the entire ignition surface of the propellant becomes greater as the ignition surface becomes more extensive. Large burning surfaces require instantaneous ignition of the entire propellant ignition surface to achieve a thrust build-up of the required rapidity.

Previous solid propellant rocket motors were ignited by localized devices. It can be readily seen such ignition results in a time delay in thrust build-up since the burning must propagate from the initial ignition point to the entire propellant surface.

It is an object of this invention to provide a relatively large solid propellant motor having a rapid thrust build-up.

Another object of this invention is to provide a solid propellant rocket motor in which the entire propellant ignition surface is ignited substantially instantaneously.

Still another object of this invention is to provide a solid propellant rocket motor which utilizes a flammable gaseous mixture confined within the motor to initiate instantaneous and complete ignition of the entire propellant ignition surface.

In carrying out the invention, a combustible gaseous mixture is disposed in the motor and the motor is provided with apparatus to ignite the mixture. The burning of the gaseous mixture in turn initiates instantaneous and complete ignition of the entire propellant ignition surface, thus eliminating a delay in thrust build-up.

For more complete understanding of the invention, reference is made to the following detailed description and accompanying drawings, in which.

Figure 1:
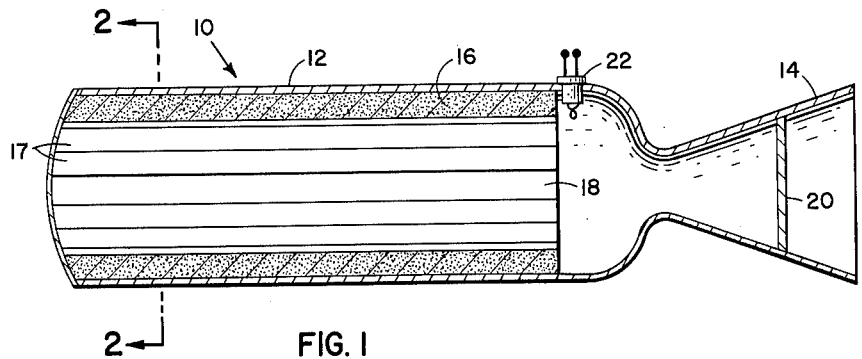
FIGURE 1 is a sectional view of a solid propellant rocket motor, illustrating certain of the motor components which are a part of my invention.
Figure 2:
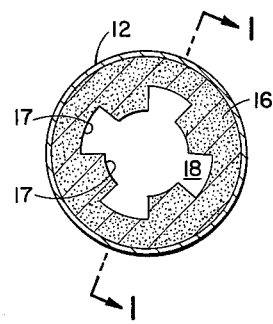
FIGURE 2 is a view taken along the lines 2—2 of FIGURE 1.

Referring now to FIGURE 1, the solid propellant rocket motor 10 includes an outer shell 12 which serves as a propellant container as well as a combustion chamber. A nozzle 14 is formed integrally with shell 12 to exhaust the thrust gases of motor 10. Shell 12 contains a solid propellant 16 which forms a combustion chamber 18 along the longitudinal axis of motor 10. A configuration of solid propellant as illustrated in FIGURE 2 exposes a relatively large ignition surface 17, allows more rapid burning of the propellant and ultimately results in a higher thrust available at the nozzle. An insert 20 is provided in nozzle 14 and serves to isolate chamber 18 from the surrounding atmosphere.

Fuels such as butane, propane or methane may be used while air and oxygen are examples of satisfactory oxidizers. The fuel oxidizer ratio may be varied depending upon the temperature and pressure desired. However, the gases would normally be mixed to the proper stoichiometric ratio, the addition of an inert gas being used to vary the results of combustion as desired. Insert 20 confines the gaseous mixture in chamber 18. A particular composition and initial pressure of gases is chosen to cause the temperature of the propellant surface to rise to the propellant's ignition point when the gaseous mixture is ignited. Any suitable ignition device 22, as a spark plug or squib, is disposed to extend through through shell 12 and into chamber 18.

In operation the ignition device 22 is activated by conventional means (not shown) to cause ignition of the gaseous mixture confined in chamber 18. Heat and high velocity shock waves produced by the burning gases cause the temperature of the entire ignition surface 17 to rise to its burning point thus initiating ignition of the entire ignition surface at the same instant. During the insuing pressure build-up within chamber 18 insert 20 is blown free of nozzle 14 and maximum thrust is attained in a minimum of time.

In the embodiment illustrated in FIGURE 3, the particular composition and initial pressure of gases confined in cavity 18a is chosen to cause a temperature rise of the propellant grain surface 17a to just below the propellant's ignition point. A propellant ignitor 26 is actuated by a delay mechanism 28 which receives a firing signal in unison with the gas ignitor 22a and delays the signal a predetermined time before passing it on to the propellant ignitor.

Figure 3:
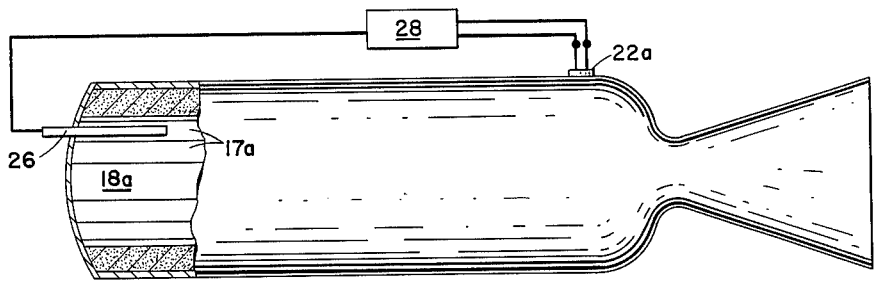
FIGURE 3 is an elevation of a rocket motor having portions thereof cut away to more clearly illustrate the components of a second embodiment of my invention.

In operation of the device illustrated in FIGURE 3 ignition device 22a is actuated by conventional means (not shown) to cause substantially instantaneous burning of the gaseous mixture confined to cavity 18a. Heat and high velocity shock waves produced by the burning gases in turn heat grain surface 17a to just below the ignition point. Mechanism 28 then delays the actuation of propellant ignitor 26 a predetermined time until the rise in propellant ignition surface temperature is complete. Propellant ignitor 26 is then actuated. Propellant grain surface 17a having been preheated, the additional step of raising the temperature of the entire surface to ignition or burning temperature requires a minimum of time.

A plurality of ignition devices 22 may be placed in several positions about shell 12 to insure complete and uniform ignition of the gaseous mixture.

It is also to be understood that various other modifications of this invention can be made without changing the spirit and scope of the invention as claimed.

I claim:

1. A rapid igniting rocket motor comprising a propellant container having an opening therein, a nozzle attached to said container around said opening, a solid propellant charge mounted within said container, a combustion chamber formed in said propellant charge, a removable insert mounted in said nozzle isolating said chamber from the surrounding atmosphere, a combustible gas sealed in said chamber by said removable insert, means for igniting said gas whereby said burning gas will ignite the surface of said propellant charge and the pressure caused by the burning of said charge will effect removal of said insert.

2. A device as set forth in claim 1 wherein said combustible gas comprises a mixture of fuel and oxidizer.

3. A device as set forth in claim 1 wherein said combustible gas comprises a mixture of fuel, oxidizer and inert gas.

4. A rapid fuel igniting system comprising a closed fuel chamber, a solid fuel disposed within said chamber, a combustible gas sealed within said chamber, ignitor means operatively associated with said chamber for igniting said gas, means in said chamber for raising the temperature therein after ignition of said gas, and a delay mechanism operatively connected between said gas ignitor means and said temperature raising means whereby said temperature raising means will be actuated in response to actuation of the ignitor means a predetermined time after actuation of said ignitor means.

5. A rapid fuel igniting system as set forth in claim 4 wherein said gas is of such composition that burning of said gas will raise the temperature of said chamber to a temperature less than the ignition temperature of said fuel whereby actuation of said temperature raising means will raise the temperature in said chamber at least to the ignition temperature of said fuel.

6. A rapid fuel igniting system as set forth in claim 4 wherein said gas is a mixture of fuel and oxidizer.

7. A rapid fuel igniting system as set forth in claim 4 wherein said gas is a mixture of fuel, oxidizer and inert gas.

8. In a rapid ignition solid propellant rocket motor including a closed combustion chamber having a solid propellant disposed therein and a combustible gaseous mixture sealed in said closed chamber, the method of igniting said solid propellant comprising the steps of: igniting said gaseous mixture whereby the temperature in said chamber will be raised to the temperature immediately below the ignition temperature of said fuel, and thereafter raising said chamber temperature to at least the ignition temperature of said fuel.

References Cited by the Examiner
UNITED STATES PATENTS

| | | | |
|---|---|---|---|
| 2,917,894 | 12/1959 | Fox | 60—35.6 |
| 2,996,880 | 8/1961 | Greiner | 60—35.6 |
| 3,136,119 | 6/1964 | Avery | 60—35.6 |
| 3,156,092 | 11/1964 | Holzman | 60—35.6 |
| 3,157,025 | 11/1964 | Herring | 60—35.6 |
| 3,204,560 | 9/1965 | Gustavson. | |

MARK NEWMAN, *Primary Examiner.*

CARLTON R. CROYLE, *Examiner.*